Patented Feb. 14, 1933

1,897,516

UNITED STATES PATENT OFFICE

RICHARD HERZ, OF FRANKFORT-ON-THE-MAIN, EDUARD ALBRECHT, OF FECHENHEIM NEAR FRANKFORT-ON-THE-MAIN, AND RICHARD DERESER, OF HOCHST-ON-THE-MAIN, GERMANY, ASSIGNORS TO GENERAL ANILINE WORKS, INC., OF NEW YORK, N. Y., A CORPORATION OF DELAWARE

PROCESS FOR MANUFACTURING PHENYLTHIOGLYCOLLIC ACIDS, CONTAINING HALOGEN AND ALKYL GROUPS IN THEIR MOLECULE

No Drawing. Application filed November 3, 1927, Serial No. 230,921, and in Germany November 24, 1926.

In the application of Richard Herz, Wilhelm Bauer and Norbert Steiger Serial No. 230,922, filed November 3, 1927 now Patent No. 1,832,209 a process for manufacturing phenylthioglycollic acids, containing halogen and alkyl groups in their molecule, is described, which process consists in treating halogenalkylbenzenes with chlorosulfonic acid at temperatures below 100°, reducing the halogenalkylbenzenesulfochlorides thus formed to the corresponding mercaptan compounds and condensing the latter with monochloro-acetic acid.

Our present invention consists in a specific application of the aforesaid process and relates to the production of phenylthioglycollic acid derivatives of the general formula:

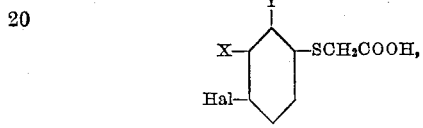

in which formula X means hydrogen or alkyl, Y alkyl or halogen, by starting from benzene derivatives of the formula:

in which formula X and Y have the aforesaid signification.

In order to further illustrate our invention the following examples are given, the parts being by weight and all temperatures in centigrade degrees, but it is understood that our invention is not limited to the particular products or reaction conditions mentioned therein.

*Example 1*

(a) Production of 1-methyl-5-chlorobenzene-2-sulfochloride of the formula:

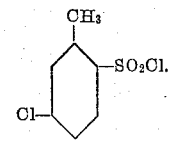

12.6 parts of meta-chlorotoluene are introduced while stirring into about 50 parts of chlorosulfonic acid, the temperature should advantageously not exceed 40°. When the evolution of hydrochloric acid ceases the temperature is increased to about 50° and kept for some time while stirring. After cooling down, the mass is poured on ice; the reaction product separates after some time in a crystalline form, it is filtered and washed. It can be directly used for the further process. If recrystallized from benzine, the formed 1-methyl-5-chlorobenzene-2-sulfochloride melts at 54°

(b) Production of 1-methyl-5-chlorobenzene-2-mercaptan of the formula:

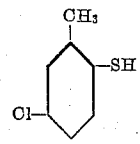

The sulfochloride obtained according to (a) is introduced while moist in an apparatus provided with reflux condenser into a mixture of 60 parts of sulfuric acid of 95% and 100 parts of ice while stirring and cooling well. Then slowly 25 parts of zinc dust advantageously in form of an aqueous paste are added. The temperature rises to about 90° and the mass is kept at this temperature for some hours. When the reaction is complete the mass is cooled down; the 1-methyl-5-chlorobenzene-2-mercaptan formed separates from the solution, it is filtered and washed. It may be purified by steam distillation.

(c) Production of 1-methyl-5-chlorobenzene-2-thioglycollic acid of the formula:

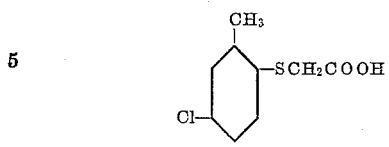

The mercaptan compound described above is dissolved while moist in dilute caustic soda solution and at about 20–30° a solution of 9.3 parts of the sodium salt of mono-chloroacetic acid in 30 parts of water is added. Then the mixture is heated to boiling for an hour and from the cooled and filtered solution the reaction product is separated by acidification. The formed 5-chloro-1-methylbenzene-2-thioglycollic acid represents a snow-white crystalline powder, melting at 127°, when recrystallized from benzene.

When starting from meta-bromotoluene, in the same manner the 5-bromo-1-methylbenzene-2-thioglycollic acid is obtained.

Example 2

(a) Production of 1-methyl-2.6-dichlorobenzene-3-sulfochloride of the formula:

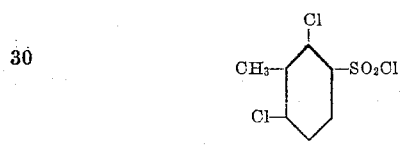

At about 30–35° 8.1 parts of 1-methyl-2.6-dichlorobenzene (boiling point 199–200°) are slowly introduced while stirring into 32 parts of chlorosulfonic acid. Then the mass is kept for some hours at about 60° while stirring. After cooling down it is poured on ice and the reaction product separates at first in an oily state, solidifying after some time to a solid cake of crystals. The 1-methyl-2.6-dichlorobenzene-3-sulfochloride formed shows after one recrystallization the melting point 60° as described in literature.

(b) Production of 1-methyl-2.6-dichlorobenzene-3-mercaptan of the formula:

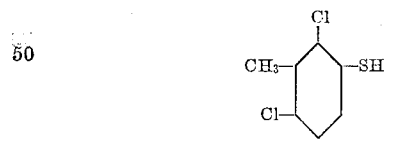

26 parts of the aforesaid sulfochloride are introduced into a mixture of about 55 parts of sulfuric acid of 66° Bé. and 120 parts of water and slowly about 30 parts of zinc dust are added while stirring; the temperature of the mass is advantageously about 80°. The reduction process runs smoothly and after cooling down the mercaptan compound formed separates as a crystalline mass; it is isolated by filtration and can directly be used for the production of the thioglycollic acid compound. In order to obtain it in a pure form it may be subjected to a steam distillation.

(c) Production of 1-methyl-2.6-dichlorobenzene-3-thioglycollic acid of the formula:

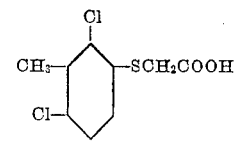

19.3 parts of the aforesaid mercaptan are dissolved in dilute caustic soda solution and at ordinary temperature 10.7 parts of monochloroacetic acid in form of its sodium salt are added. The mixture is digested, until a test does not show a yellow coloration with a solution of lead acetate. The 1-methyl-2.6 dichlorobenzene-3-thioglycollic acid formed may be isolated in form of the difficulty soluble salts of sodium or calcium by adding common salt or chalk to the solution, or it may be separated as free acid by acidifying the cooled solution. In a pure state it melts at 100°.

We claim:

1. A process for manufacturing phenylthioglycollic acids of the general formula:

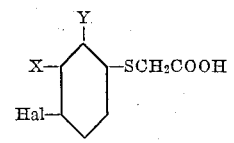

in which formula X means hydrogen or alkyl, Y alkyl or halogen, but either X or Y must be alkyl, which process comprises treating halogen-alkylbenzenes of the general formula:

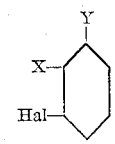

in which formula X and Y have the aforesaid signification, with chlorosulfonic acid at temperatures below 100°, reducing the halogenalkylbenzenesulfochlorides thus formed to the corresponding mercaptan compounds and condensing the latter with monochloroacetic acid.

2. A process for manufacturing phenylthioglycollic acids of the formula:

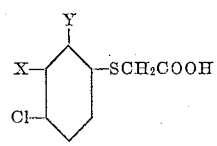

in which formula X means hydrogen or methyl, Y methyl or chlorine, but either X or Y must be methyl, which process comprises treating chloromethylbenzenes of the formula:

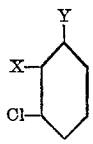

in which formula X and Y have the aforesaid signification, with chlorosulfonic acid at temperatures below 100°, reducing the halogenalkylbenzenesulfochlorides thus formed to the corresponding mercaptan compounds and condensing the latter with monochloroacetic acid.

3. A process for manufacturing the 1-methyl-5-chlorobenzene-2-thioglycollic acid of the formula:

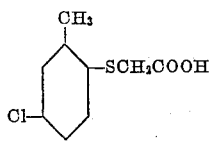

which process comprises treating metachlorotoluene with chlorosulfonic acid at temperatures below 100°, reducing the 1-methyl - 5 - chlorobenzene - 2 - sulfochloride formed to 1-methyl-5-chlorobenzene-2-mercaptan and condensing the latter with monochloroacetic acid.

4. The process which comprises introducing one molecular proportion of a compound of the following formula:

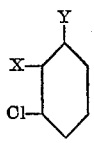

wherein X represents hydrogen or methyl, and Y represents methyl or chlorine, but either X or Y must be methyl, into about the four- to sixfold molecular proportion of chlorosulfonic acid at a temperature of from 30 to 40° C., raising the temperature, after the evolution of the hydrochloric acid has ceased, to 50 to 60° C., and keeping the reaction mixture at this temperature while stirring until the reaction has finished.

5. The process which comprises introducing 8.1 parts of the compound of the following formula:

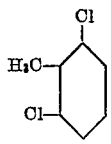

into about 32 parts of chlorosulfonic acid at a temperature of about 30 to 35° C., raising the temperature to about 60° C., and keeping the reaction mixture at this temperature while stirring until the reaction has finished.

6. The process which comprises introducing 12.6 parts of the compound of the following formula:

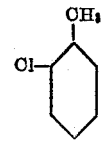

into about 50 parts of chloro-sulfonic acid at a temperature of about 40° C., raising the temperature, after the evolution of the hydrochloric acid has ceased, to about 50° C., and keeping the reaction mixture at this temperature while stirring until the reaction has finished.

In testimony whereof, we affix our signatures.

RICHARD HERZ.
EDUARD ALBRECHT.
RICHARD DERESER.